United States Patent
Parker, Jr. et al.

(10) Patent No.: US 10,535,003 B2
(45) Date of Patent: Jan. 14, 2020

(54) ESTABLISHING SEMANTIC EQUIVALENCE BETWEEN CONCEPTS

(71) Applicants: NamesForLife, LLC, East Lansing, MI (US); Board of Trustees of Michigan State University, East Lansing, MI (US)

(72) Inventors: Charles T. Parker, Jr., East Lansing, MI (US); George M. Garrity, Okemos, MI (US); Nenad Krdzavac, East Lansing, MI (US)

(73) Assignees: NamesForLife, LLC, East Lansing, MI (US); Board of Trustees of Michigan State University, East Lansing, MI (US)

( * ) Notice: Subject to any disclaimer, the term of this patent is extended or adjusted under 35 U.S.C. 154(b) by 973 days.

(21) Appl. No.: 15/022,870

(22) PCT Filed: Sep. 22, 2014

(86) PCT No.: PCT/US2014/056808
§ 371 (c)(1),
(2) Date: Mar. 17, 2016

(87) PCT Pub. No.: WO2015/042536
PCT Pub. Date: Mar. 26, 2015

(65) Prior Publication Data
US 2016/0224893 A1     Aug. 4, 2016

Related U.S. Application Data

(60) Provisional application No. 61/880,244, filed on Sep. 20, 2013.

(51) Int. Cl.
*G06N 5/02* (2006.01)
*G06F 16/23* (2019.01)
*G06F 16/22* (2019.01)

(52) U.S. Cl.
CPC .......... *G06N 5/02* (2013.01); *G06F 16/2228* (2019.01); *G06F 16/23* (2019.01)

(58) Field of Classification Search
CPC .......... G06N 5/04; G06N 99/005; G06N 5/02; G06N 5/003; G06Q 30/02
(Continued)

(56) References Cited

U.S. PATENT DOCUMENTS 6,442,732 B1   8/2002  Abramovici et al.
7,308,363 B2  12/2007  Eker et al.
(Continued)

FOREIGN PATENT DOCUMENTS

EP   1273958 A2   1/2003
EP   1672076 A1   6/2006
(Continued)

OTHER PUBLICATIONS

PCT/US2014/056808, International Search Report and Written Opinion, dated Jan. 9, 2015, 9 pages.
(Continued)

*Primary Examiner* — Scott A. Waldron
*Assistant Examiner* — Viker A Lamardo
(74) *Attorney, Agent, or Firm* — Casimir Jones, S.C.; David Casimir

(57) ABSTRACT

A method for establishing semantic equivalence between a plurality of concepts including: providing an Orthogonal Semantic Equivalence Map in which first, second, and third extensional concept models are related; selecting or deselecting a concept in the first concept model; selecting or deselecting a (relation, concept) pair representing an intensional relation from a concept in the first concept model to a concept in the second concept model over a concept in the third concept model; determining a subset of intensional relations from the selected concepts in the first concept
(Continued)

CV1. Vector mapping terms from a controlled vocabulary to unique concept identifiers.

| aerobe | P.1.1 |
| obligate aerobe | P.1.1.1 |
| strict aerobe | P.1.1.1 |
| microaerophilic | P.1.1.2 |
| anaerobe | P.1.2 |
| obligate anaerobe | P.1.2.1 |
| strict anaerobe | P.1.2.1 |
| aerotolerant | P.1.2.2 |
| facultative anaerobe | P.1.3 |

CT1. Hierarchical concept model for vocabulary CV1.

model to concepts in the second concept model; determining a set of concepts from the first concept model that are related to concepts in the second concept model over the selected (relation, concept) pairs; and determining the narrowest common extension of the set of concepts from the first, second, or third concept models that are related over the selected intensional relations.

34 Claims, 11 Drawing Sheets

(58) Field of Classification Search
USPC .................................................. 706/46
See application file for complete search history.

(56) References Cited

U.S. PATENT DOCUMENTS

| | | | |
|---|---|---|---|
| 7,925,444 | B2 | 4/2011 | Garrity et al. |
| 8,065,360 | B2 | 11/2011 | Jung et al. |
| 8,380,658 | B2 | 2/2013 | Jung et al. |
| 8,447,092 | B2 | 5/2013 | Kii et al. |
| 8,903,825 | B2 * | 12/2014 | Parker .................. G06F 16/355 |
| | | | 707/737 |
| 2002/0171051 | A1 | 11/2002 | Nakagaki et al. |
| 2005/0131649 | A1 | 6/2005 | Larsen et al. |
| 2005/0149510 | A1 * | 7/2005 | Shafrir .................. G06F 16/367 |
| 2006/0206293 | A1 | 9/2006 | Poulin |
| 2007/0072304 | A1 | 3/2007 | Kraemer et al. |
| 2007/0083359 | A1 | 4/2007 | Bender |
| 2007/0134787 | A1 | 6/2007 | Shirakawabe et al. |
| 2007/0178501 | A1 | 8/2007 | Rabinowitz et al. |
| 2010/0082520 | A1 | 4/2010 | Pierre et al. |
| 2010/0198841 | A1 | 8/2010 | Parker et al. |
| 2012/0081276 | A1 | 4/2012 | Ullrich et al. |
| 2013/0054506 | A1 | 2/2013 | Hubauer et al. |
| 2013/0095936 | A1 | 4/2013 | Gnezdilov |
| 2013/0132386 | A1 * | 5/2013 | Runchey .............. G06F 16/367 |
| | | | 707/736 |
| 2013/0156287 | A1 | 6/2013 | Houjou et al. |
| 2013/0246046 | A1 * | 9/2013 | Fan ..................... G06F 17/2785 |
| | | | 704/9 |
| 2015/0347621 | A1 | 12/2015 | Hu et al. |

FOREIGN PATENT DOCUMENTS

| | | | |
|---|---|---|---|
| WO | 1993019433 A1 | 9/1993 | |
| WO | 1995031529 A1 | 11/1995 | |
| WO | 2000067155 A1 | 11/2000 | |
| WO | WO2005062202 A2 * | 7/2005 | ............ G06F 17/30 |
| WO | 2006092925 A1 | 9/2006 | |
| WO | 2007105363 A1 | 9/2007 | |
| WO | 2012052280 A1 | 4/2012 | |
| WO | 2014064712 A1 | 6/2014 | |

OTHER PUBLICATIONS

Aggarwal, Charu C. and Cheng-Xiang Zhai. Mining Text Data. Springer (2012).
Baader, et al., "Pushing the EL Envelope Further," CEUR Workshop Proceedings, 13 pages (Nov. 2010).
Bowers et al., "Lightweight Ontology-Based Tools for Observational Data," Proceedings of the 1st International Workshop on Semantics for Biodiversity, Montpellier, France, pp. 71-86 (May 27, 2013).
Chang, et al. "A Survey of Web Information Extraction Systems." IEEE Transactions on Knowledge and Data Engineering, vol. 16, No. 10, pp. 1411-1426 (2006).
Giglio, et al., "Development of an Ontology of Microbial Phenotypes," ICBO: International Conference on Biomedical Ontology, Buffalo, NY, pp. 167-171 (Jul. 24-26, 2009).
Harris, et al., "FYPO: The Fission Yeast Phenotype Ontology," Bioinformatics, vol. 29, No. 13, pp. 1671-1679 (May 8, 2013).
Kelling, Steve, "Significance of Organism Observations: Data Discovery and Access in Biodiversity Research," Report for the Global Biodiversity Information Facility, Copenhagen, 20 pages (2008).
Madin et al, "An Ontology for Describing and Synthesizing Ecological Observation Data," Ecological Informatics, vol. 2, No. 3, pp. 279-296 (2007).
Morshed, et al, From AGROVOC OWL Model Towards AGROVOC SKOS Model. [online] FAO, 2010 [retrieved on Mar. 7, 2016] Retrieved from the Internet: <URL: www.fao.org/docrep/.../al300e00.pdf>, 4 pages.
Nagai, et al, "Interoperability for Global Observation Data by Ontological Information," Tsinghua Science and Technology, vol. 13, No. S1, pp. 336-342 (Oct. 2008).
Russ et al., "Knowledge Engineering Tools for Reasoning with Scientific Observations and Interpretations. A Neural Connectivity Use Case," Bioinformatics, 15 pages (2011).
Search Report of related EP Application No. 14845555.3, dated May 9, 2017, 10 pages.
Anonymous: "CEBS Data Model—XBRLWiki", Feb. 28, 2012, Retrieved from URL:http://web.archive.org/7pages. web/20120228194115/http://www.xbrlwiki.info/index.php?title=CEBS_Data_Model, retrieved Apr. 21, 2017.

* cited by examiner

| | | E.1 | | | |
|---|---|---|---|---|---|
| | | | E.1.2 | | |
| | E.1.1 | | E.1.2.1 | E.1.2.2 | |
| | G.1.2 | | G.1.2 | G.1.1 | |
| | G.1.2 | | G.1.1.1 | G.1 | |
| | G.1.1 | | G.1.2 | G.1.2 | |
| | G.1.1 | | G.1.1 | G.1 | |
| | | | G.1.1 | | |
| P.1.1.1 | P.1.1.2 | P.1.2.1 | P.1.2.2 | P.1.3 | |
| P.1.1 | | P.1.2 | | | |
| P.1 | | | | | |

OSEM5 →

Figure 5

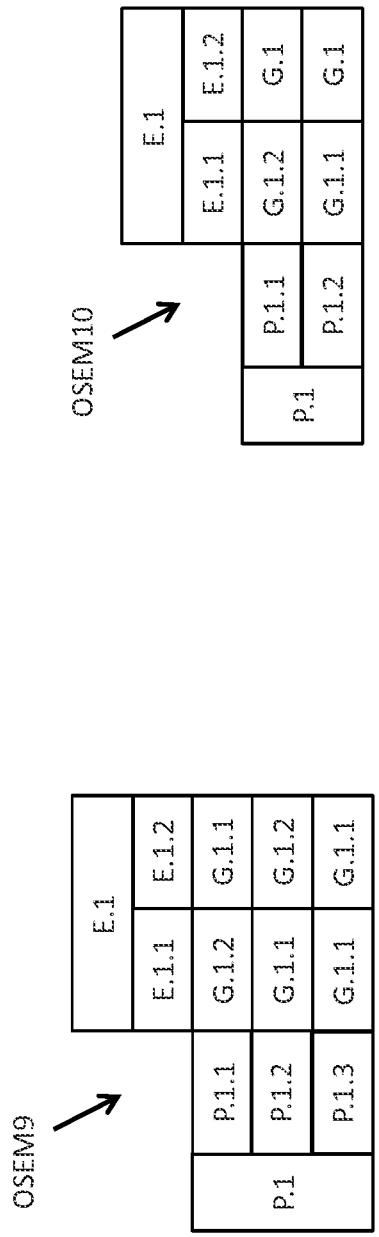

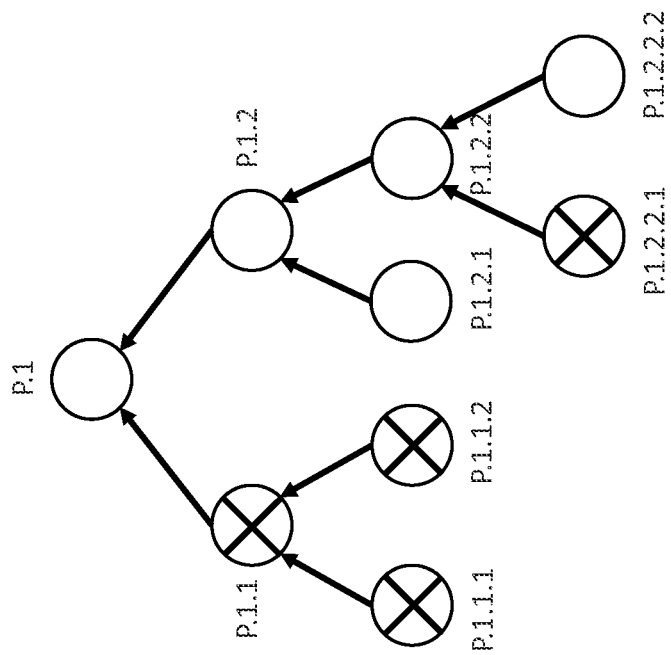
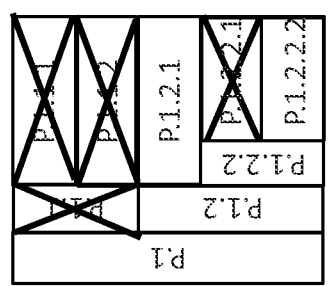
Figure 12

ESTABLISHING SEMANTIC EQUIVALENCE BETWEEN CONCEPTS

CROSS-REFERENCE TO RELATED APPLICATIONS

This application is a U.S. National Phase Application under 35 U.S.C. 371 of International Application No. PCT/US2014/056808, filed on Sep. 22, 2014, which claims priority to U.S. Provisional Application No. 61/880,244, filed Sep. 20, 2013, titled "SYSTEMS AND METHODS FOR ESTABLISHING SEMANTIC EQUIVALENCE BETWEEN CONCEPTS", the contents of which are incorporated herein by reference in their entirety.

GOVERNMENT SUPPORT

This invention was made with government support under STTR Award No. DE-SC0006191 awarded by the Department of Energy. The government has certain rights in the invention.

FIELD OF THE INVENTION

The present invention relates to information processing, specifically for interpreting recorded data and textual content using formal logic and reasoning engines to check satisfiability, detect constraint violations, and infer new, verifiable, and missing features of entities based on recorded properties.

Human language inherently produces technical vocabularies (Subject Language Terminologies, or SLTs) that contain ambiguous (overlapping and/or imprecise) concepts. These ambiguities often result from an inability to completely and precisely describe the subject matter, or to distinguish it from existing subject matter. This is particularly problematic for discoveries and new methods being introduced into a field. New discoveries may require a refinement of existing terminologies or may produce new, more narrowly defined and precise terms. Obsolete terms may fall out of use, but in many cases may still be used to describe existing concepts. This is especially common in new or rapidly evolving terminologies, during convergence of two or more technical fields, and when comparing older content (literature or data) to newer content after terminology or methods have changed. In scientific, technical, and medical (STM) literature, information is reported at various levels of abstraction (for example, sometimes having precise numeric data and other times having ambiguous or imprecise terms). This confounds automated text mining and data mining methods, as information extracted from textual content or disparate databases (based on extensional concept models) or triplestores (based on intensional concept models) requires interpretation and normalization prior to storage. Interpretation is often dependent on an individual's biases or limited understanding of the text or data, and normalization of data from multiple sources often results in loss of precision as data or terms are abstracted to their lowest common denominator or closest match in a targeted domain vocabulary. Subsequent population of ontologies with these normalized data may result in incorrect inferences when used in combination with reasoning engines.

SUMMARY

Disclosed are systems and methods for processing information encoded in both intensional and extensional knowledge organization systems using Orthogonal Semantic Equivalence Maps, data structures capable of transforming qualitative and quantitative data over orthogonal relations between three or more concept models. Concept adapters and concept filters based on Orthogonal Semantic Equivalence Maps extend the applications to data translation and concept indexing. The method, computer-based system and applications of Orthogonal Semantic Equivalence Maps are herein described and claimed.

Orthogonal Semantic Equivalence Mapping (OSEM) is a method for deriving precise meanings of terms and producing precise concept relations over multiple technical vocabularies and imputed concepts. Semantic Equivalence is established via construction of imputed concepts, which circumscribe other concepts in whole (via concept aggregation) or in part (via concept division). Imputed concepts do not necessarily map to any previously described, labeled, or named concepts. Optionally, terms and numeric data may be functionally mapped into concepts represented in an Orthogonal Semantic Equivalence Map. OSEM is generally applicable, at any level of abstraction, for assigning definitions to concepts, for providing hooks for queries, axioms, rules, functions, templates, constraints, and for bridging the fields of text-mining, data-mining, and ontologies.

In one embodiment, a method for establishing semantic equivalence between a plurality of concepts. The method includes the steps of: providing an Orthogonal Semantic Equivalence Map in which first, second, and third extensional concept models are related to one another such that the second concept model is orthogonal to the first concept model and the third extensional concept model is distinct from the first and second concept models, wherein each concept from the first concept model has an intensional relation to one concept from the second concept model over one concept in the third concept model as a (relation, concept) pair, wherein each concept represented in the first concept model is selectable or de-selectable, and wherein each intensional relation between concepts in the first and second concept model is selectable or de-selectable; at least one of selecting or de-selecting a concept in the first concept model; at least one of selecting or de-selecting a (relation, concept) pair representing an intensional relation from a concept in the first concept model to a concept in the second concept model over a concept in the third concept model; based on the at least one of selecting or de-selecting a concept in the first concept model, determining a subset of intensional relations from the selected concepts in the first concept model to concepts in the second concept model; based on the at least one of selecting or de-selecting a (relation, concept) pair representing and intensional relation over a concept in the third concept model, determining a set of concepts from the first concept model that are related to concepts in the second concept model over the selected (relation, concept) pairs, based on the set of selected (relation, concept) pairs, determining a set of de-selected (relation, concept) pairs; and determining at least one of the narrowest common extension of the set of concepts from the first, second, or third concept models that are related over the selected intensional relations, wherein the narrowest common extension of the selected concepts from the first concept model is designated as being semantically equivalent to the set of selected (relation, concept) pairs relating each selected concept from the first concept model to a concept in the second concept model.

In another embodiment, a system for establishing semantic equivalence between a plurality of concepts. The system includes a user interface, a storage medium, and a controller in operative communication with the user interface and the storage medium, where the controller configured to carry out methods according to various embodiments of the invention.

Other aspects of the invention will become apparent by consideration of the detailed description and accompanying drawings.

BRIEF DESCRIPTION OF THE DRAWINGS

FIG. 5 shows an Orthogonal Semantic Equivalence Map (OSEM) that provides a mapping between orthogonal concept models from FIGS. 1, 3, and 4.

FIG. 9 shows an OSEM mapping the concepts of aerobe, anaerobe and facultative anaerobe.

FIG. 10 shows the contrast between OSEM2 and OSEM9. A simplified OSEM (OSEM10) produced from OSEM2 (see FIG. 2), using only concepts present in the concept axes of OSEM9 (see FIG. 9).

FIG. 12 depicts determining Narrowest Common Extension for selected concepts in an extensional concept model. In the model shown, concepts P.1, P.1.2, P.1.2.1, P.1.2.2, and P.1.2.2.2 are selected. To determine the Narrowest Common Extension, the concept model may be traversed breadth-first from the top concept P.1. From each concept in the traversal, the child concepts are checked whether they are selected. If multiple child concepts are selected, the traversal stops and the current concept is output as the Narrowest Common Extension. If only a single child concept is selected, the traversal continues to that child concept. In this example, concept P.1.2 is the Narrowest Common Extension because it is the narrowest concept that contains a branch. If the traversal continues down to a non-branching concept, that concept is considered the Narrowest Common Extension.

DETAILED DESCRIPTION

Figure 1:
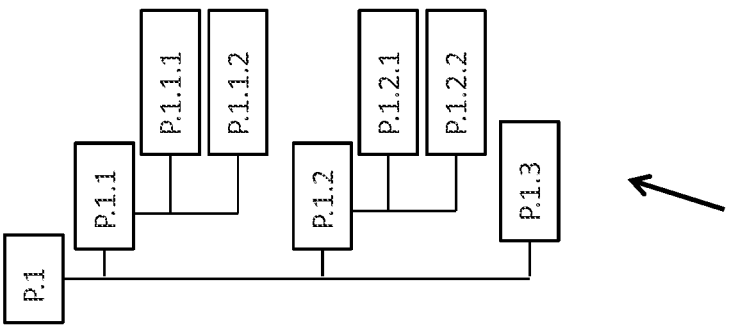
FIG. 1 shows a controlled vocabulary for oxygen tolerance phenotypes for bacteria and an associated concept model. Each concept in the model has a unique identifier (e.g., concept P.1.1.1), which may be associated with zero or more terms (e.g., "strict aerobe" and "obligate aerobe") in the vocabulary. The top level concept P.1 represents any concept in the model.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Disclosed here are systems and methods whereby entity properties are encoded so as to be interpretable and operable by machines and to allow machines to infer properties of entities in the absence of direct observations of those properties.

The disclosure includes the following terminology:

Agent: A human, machine, software system or other entity that is capable of performing an action.

Logical Calculus (also "formal language", "logistic system", or "logical formalism"): A system in which explicit rules are provided for determining (a) which are the expressions of the system; (b) which sequences of expressions count as well formed (well-formed formulae, or wffs); (c) which sequences of wffs count as proofs. A system may contain axioms, and a wff that terminates a proof will be a theorem.

Formal Logic: Logical calculus that can be expressed as an application of an abstract rule that is not about any particular thing or property.

Decidable Formal Logic: A formal logic that has an effective method to determine membership in a particular set of formulas.

Axiom: A statement in a formal knowledge representation language that asserts certain constraints that must be satisfied by some concepts, roles and individuals.

Reasoning (also referred to as an "Inference"): A process in which implicit knowledge is generated from explicit knowledge through a set of axioms.

Inference: Synonym for reasoning.

Reasoning engine: A system or machine that is used to perform automated reasoning.

Rule: A formula expressed in a rule language. It is used to infer new statements based on existing statements in knowledge base.

Expression (in a formal logic): A formula built by using syntax rules defined in a formal logic.

Meta-model: In the context of model-driven engineering, a meta-model is a model of a model in a particular domain.

Data: Numeric, textual, symbolic or binary values that represent individual qualitative or quantitative pieces of information.

Normalized: Data that has been processed to conform to some defined structure or format.

Queryable: Able to be reproducibly retrieved.

Repository: A resource from which digital content may be retrieved.

Data Source (or information resource): A queryable repository containing (optionally normalized) data.

Data Store: A data source wherein the data it contains conforms to some defined structure.

Schema: A well-defined or formalized structure for representing normalized data.

Database: A data store conforming to a schema.

Label: A text sequence comprised of any combination of words, letters, numbers or symbols.

Term: A label that contains or conveys information. A term may optionally be associated with one or more other terms that are considered equivalent (synonymous) and the same term may be applied to multiple concepts and convey a different meaning (polysemous).

Name: A term that is used for identification of a concept or entity.

Identifier (or ID): A label that is uniquely applied to an entity or term for the purpose of distinguishing one entity or term from another. An identifier may follow an encoding system or may be arbitrary. An identifier may be unique only to a particular vocabulary or group of entities (locally unique), or an identifier may be unique across all vocabularies and entities (globally unique or GUID). An identifier may optionally be persistent (a PID, permanently associated with an entity or other term). An identifier may optionally be registered (stored in an authoritative location with an association to the entity or other term that it identifies) and resolvable (electronically traversable from the identifier to the entity or term it is applied to), such as a Digital Object Identifier (DOI) or Life Science Identifier (LSID).

Vocabulary: A collection of terms that are optionally are ordered.

Controlled vocabulary: A vocabulary containing terms selected by professionals in a subject area.

Entity (or "individual", "exemplar", "referent"): A physical or artificial construct that is describable (e.g., an animate object, an inanimate object, a location, a digital resource, or an event). In the Examples below, the bacterial species "strain X" would be an example of an Entity.

Concept: A particular grouping of other concepts or entities. A concept may optionally be associated with one or more labels.

Thing: A concept or entity.

Subject Language Terminology (or "SLT", or "terminology"): A vocabulary used with a particular technical application in a subject of study, theory, profession, etc.

Concept model (or Conceptual Graph): A set of related concepts that are optionally organized as a graph, hierarchy or taxonomy. The relations in a concept model may be formally defined (e.g., narrower or broader concepts in a SKOS model).

Relation (between concepts): A connection that is made between two concepts that conveys a particular interpretation of meaning (e.g., [Concept A] o [Concept B], where "o" is a relation defined as "observed to grow under condition").

Orthogonal concept models: Two concept models are considered orthogonal to each other if they are (1) independent (no concept in the first model exists in the second model); (2) at least one concept in the first model may be mapped to a concept in the second model over some defined relation between the two concept models.

Orthogonal vocabularies: Two vocabularies for which their concept models are orthogonal.

Concept filter: An Orthogonal Semantic Equivalence Map that contains a set of assertions that any concept must satisfy in order to be considered a match by the filter.

Dictionary: A vocabulary wherein each term is assigned a definition.

Thesaurus (plural "thesauri"): A vocabulary that groups terms according to similarity in meaning.

Referition (of a concept): The meaning of a concept based on the entities (referents) to which the concept refers.

Definition (of a concept): The meaning of a concept based on other related concepts.

Definition (of a term): The definition(s) of the concept that a term references.

Semantic Equivalence (of concepts): The assertion that the definition of a first concept conveys the same meaning as the definition of a second concept.

Semantic Equivalence (of terms): The assertion that a definition of a first term is identical toconveys the same meaning as the definition of a second term.

Discovered concept: A new concept that has not been previously identified or defined.

Classification scheme: A formal or informal system of grouping entities.

Taxonomic category: A set of entities that are grouped together according to some classification scheme.

Taxonomic rank (or "rank"): One level of granularity in a hierarchical sequence of taxonomic categories. A rank may be coarse grained (indicating a taxon that is defined broadly or abstractly, representing many individuals) or fine grained (indicating a taxon that is defined narrowly, representing few individuals).

Taxon (plural "taxa"): A concept that has an assigned rank and optionally has an assigned position within one or more taxonomies.

Taxonomy: An ordered classification of taxa by multiple ranks, usually arranged as a hierarchy progressing from broader taxa (coarser ranks) to narrower taxa (finer ranks), and optionally to individuals (entities).

Character (or characteristic): Any describable property of an entity or concept. An individual may have characters that can be observed and verified through some method. A concept may have characters that represent the shared characters of the individuals represented by the concept. Alternatively, a concept may have a set of characters for which no individuals exist.

Feature: Queryable data representing some characteristic of a concept or entity.

Descriptiveness: The degree to which a set of concepts or terms is able to completely describe a characteristic.

Expressivity: The degree to which a set of concepts (concept expressivity) or terms (vocabulary expressivity) is able to precisely define a characteristic.

Text Mining: The process of deriving high-quality information from text.

Data Mining: The process of extracting information from a data set and transforming it into an understandable structure for further use.

Corpus: A repository containing electronic documents.

n-gram: A contiguous sequence of n items from a given sequence of text (e.g., a phrase comprising n contiguous words from an electronic document).

Circumscription (of a concept): A concept that contains another concept in whole is stated to circumscribe that concept.

Extensional (definition of a concept or term): An extensional definition of a concept or term formulates its meaning by specifying every entity that falls under the definition of the concept or term in question.

Intension: Any property or quality connoted by a concept.

Intensional (definition (of a concept or term): The definition of a concept or term by listing properties that a thing must have in order to be considered part of the set captured by the definition.

Intensional containment: A concept that circumscribes some other concept over a set of properties is said to intensionally contain that concept.

Intensional relation: A relation between a first concept or entity and a second concept or entity that must be satisfied in order for the first concept or entity to be considered part of the set captured by second concept or entity. In the examples below, an intensional relation is also defined as being over a third concept (a ternary relation).

Lowest Common Ancestor (or LCA): The lowest (deepest) node in a tree that has all members of a set of nodes as descendants.

Least Common Subsumer (or LCS): The most specific concept that is an ancestor of a set of concepts.

Narrowest Common Concept Extension (or NCCE): The narrowest concept in a concept model that extensionally contains a set of concepts without branching (FIG. 12).

Relationship Extraction: A task that requires the detection and classification of semantic relationship mentions within a set of electronic resources.

The World Wide Web Consortium (or W3C): An international standards organization for the World Wide Web.

Knowledge Organization Systems (or KOS): A generic term used in knowledge organization for authority lists, classification systems, thesauri, topic maps, ontologies and controlled vocabularies.

Simple Knowledge Organization System (or SKOS): A W3C recommendation designed for representation of thesauri, classification schemes, taxonomies, subject-heading systems, or any other type of structured controlled vocabulary.

Web Ontology Language (or OWL): A family of formal languages endorsed by the W3C and used for knowledge representation in ontologies.

Structured Query Language (or SQL): A data definition and data manipulation language based on relational algebra and tuple relational calculus.

RDF: A W3C standard model for data interchange that forms a directed, labeled graph, where the edges represent the named link between two resources represented by the graph nodes.

SPARQL: A W3C standard query language for RDF graphs.

Triple: A data entity composed of subject-predicate-object, like "environment is aerobic".

Triplestore: A triplestore is a database specifically designed for storage and retrieval of triples.

Stored Procedure: A subroutine or function available to applications that access a relational database system.

Uniform Resource Name (or URN): A standardized naming structure for identifying resources.

Uniform Resource Locator (or URL): A specific character string that constitutes a reference to a resource.

Universally Unique Identifier (or UUID): An identifier standard used in software construction, standardized by the Open Software Foundation (OSF).

Globally Unique Identifier (or GUID): A unique reference number used as an identifier in computer software. The term GUID generally refers to various implementations of the UUID standard.

Digital Object Identifier (or DOI): An ISO standard persistent used to uniquely identify an object such as an electronic document and also to resolve to its current authoritative URL via a resolution server.

Life Science Identifier (or LSID): A unique identifier for data that follows the URN specification.

Archival Resource Key (or ARK): A URL that is a multi-purpose identifier for information objects of any type.

In general, a system that successfully bridges the fields of text mining, data mining and ontology-based reasoning would include one or more of the following features:

Disambiguate terms and concepts.

Map data to appropriate concepts.

Evaluate completeness and precision of terminologies.

Define previously undescribed concepts.

Detect incompletely described entities.

Enable reasoning over imprecise terminologies.

Enable interoperability between multiple concept models.

Translate knowledge between intensional knowledge representation systems and extensional knowledge representation systems (e.g., SKOS to relational database and vice-versa).

Attempts to bridge the fields of text mining, data mining and machine reasoning involve two distinct approaches to organizing knowledge: the Intensional Approach and the Extensional Approach. The differences between these two approaches have resulted in fundamental incompatibilities between formal knowledge representation systems and the curated data resources they operate on.

The intensional approach to knowledge representation defines a concept or term by listing properties that an entity must have in order to be considered part of the set captured by the definition. The extensional approach to knowledge representation defines a concept or term by specifying every object that falls under the definition of the concept or term in question. The Entity-Relationship (ER) Model is an example of an extensional approach to storing conceptual data for objects. The ER Model underlies relational databases, which are widely used in storing and querying normalized data.

A formal mapping of intensional logic to extensional approaches has been proposed but not realized. While potential links between intensional and extensional representations of objects have been proposed, actual implementation of these ideas has not been performed.

In traditional Knowledge Organization Systems (KOS), concepts are related via synonymy, homonymy, and hyponymy of concepts, where a term represents a whole concept, and the relations are imprecise ("close match" vs. "exact match"). The traditional approach is useful for supporting indexing, searching and content retrieval, but in many cases it is not sufficient for supporting precise machine reasoning due to polysemy and inherent mismatches in the concepts described by SLTs.

Knowledge representation of object properties is generally performed using Entity-Relationship (ER), Entity-Attribute-Value (EAV) or Entity-Quality (EQ) models, although the EQ approach still lacks an automated method of transforming annotations from databases into EQ statements.

Multidimensional OnLine Analytic Processing (MOLAP) was developed to provide a method of aggregating data into groups for answering queries based on multiple views of data. This method is limited to data that has been normalized, such as financial data, and does not address performing queries or reasoning in order to infer missing data or to add new classifications of concepts based on the underlying normalized data. Current approaches to performing queries and analysis over missing data involve methods such as imputing missing values from data sets over supervised learning methods, K-nearest neighbor, mean-mode imputation and listwise deletion.

Ontologies and reasoning engines have previously been employed to solve complex query-answering problems and to infer new knowledge based on existing knowledge. However, the impact of ontologies in the fields of text-mining and data-mining has been limited by an underlying mismatch between the vocabularies in Subject Language Terminologies (SLTs) and the precise concept definitions required by reasoning engines.

Garrity and Lyons (U.S. Pat. No. 7,925,444, incorporated herein by reference in its entirety) describe methods of resolving ambiguity in SLTs via resolution of labels (names) to their corresponding concepts (taxa), and provide the ability to place unlabeled taxonomic concepts in appropriate positions of multiple taxonomic views based upon their circumscription (containment) of other, more narrowly defined concepts. However, the methods of Garrity and Lyons do not address the issue of mapping multidimensional intensional concept containment models to extensional knowledge storage systems.

Several attempts at creating hybrid relational/ontology approaches to knowledge organization illustrate the difficulty of mapping data stored in extensional knowledge systems (Entity-Relationship Model for relational databases) to intensional systems (ontologies). Some attempts have relied on statistical approaches to term matching, while others set pre-requisite conditions on the design of both the ontology and relational schemas, but neither have been satisfactory.

Thus, formal integration of ontologies, relational databases, and text-mining remains an unsolved problem. Orthogonal Semantic Equivalence Mapping (OSEM) includes methods and systems for deriving precise meanings of terms and producing precise concept relations over multiple technical vocabularies and imputed concepts. Semantic Equivalence is established via construction of imputed concepts, which circumscribe other concepts in whole (via concept aggregation) or in part (via concept division). Imputed concepts do not necessarily map to any previously described, labeled, or named concepts. Optionally, terms and numeric data may be functionally mapped into concepts along a semantic axis of an OSEM. OSEM is generally applicable, at any level of abstraction, for assigning definitions to concepts, for providing precise concepts for queries, axioms and rules, and for bridging the fields of text mining, data mining, and ontologies.

Augmenting the traditional KOS and relational approaches with OSEM produces precisely defined concepts that can serve to translate between the extensional definitions of terms stored in relational databases and the intensional definitions of concepts employed in ontologies and human language.

OSEM is particularly well suited to relating terms in Subject Language Terminologies to entity features, and for facilitating interoperability between relational databases and ontologies. OSEM enables translations between vocabularies representing reference concepts (e.g., environmental conditions) to vocabularies representing sense concepts (e.g., object properties via observations) for which actual observational data does not exist or has been lost (e.g., through abstraction or normalization). Orthogonal Semantic Equivalence Maps may be represented as multidimensional matrices with each axis attached to an independent hierarchical concept model with optional constraints. An OSEM may be encoded in a relational database as a stored procedure, transformed into source code or into a suitable knowledge base such as an ontology.

This method may be applied in any of the following cases: (1) absence of any quantitative data; (2) absence of any qualitative data; (3) a mix of quantitative and qualitative data. Furthermore, regardless of the above cases, the ontology and underlying data can be queried quantitatively (e.g., "Which strains of bacterial species grow in anoxic environments?") or qualitatively (e.g., "Which strains of bacterial species are anaerobic?"). Coupled with a query end-point (e.g., a SPARQL-DL query engine), an API (application programming interface) can intrinsically support report generation or queries over features in qualitative or quantitative forms. Other ontologies and software systems may leverage this reasoning by mapping to an ontology encoding Orthogonal Semantic Equivalence Maps using any concept or relation present in the map. An OSEM may be further utilized as a filter for concept matching and indexing.

In general, Orthogonal Semantic Equivalence Maps (OSEMs) are data structures encoding intensional relations between two or more distinct extensional concept models. OSEMs may be used for information processing, specifically for converting between extensional and intensional concept definitions.

Concept models are extensional if for any concept in the model, all the lower-level concepts contained by a higher-level concept are considered to fall under the definition of the higher-level concept. Concept models are intensional if the concepts in the model are defined by specifying all properties that are necessary and sufficient for inclusion or classification by that concept.

Information processing systems may use Orthogonal Semantic Equivalence Maps to:

store intensional-extensional definitions of terms in controlled vocabularies in a structured form query quantitative data using qualitative terms or vice-versa adapt two or more different concept models to a single concept model query disparate information resources using information normalized in different ways construct concept filters to identify concepts based on assertions of intensional properties perform concept-mining in information resources index electronic resources by concept index concepts by intensional definitions In some embodiments, an OSEM includes three distinct extensional concept models with intensional relations between concepts in orthogonal axes, and some additional processing to detect semantic equivalence between orthogonal concepts. Concepts in one model may be mapped to the concepts in a second model over a relation to a concept in a third model. Two models are considered distinct if they do not share any concepts. Two models are considered orthogonal if they are distinct and for each concept in one model, a relation exists to a concept in the other model. For higher-level concepts in an extensional concept model, relations may optionally be imputed as the narrowest common extension of the relations to concepts extensionally contained by the higher level concept. The highest-level concept in any extensional concept model in an OSEM is considered to represent "any concept" within that concept model.

The concepts along one orthogonal axis of an OSEM are selectable and de-selectable. The selection or de-selection of concepts triggers computation of semantically equivalent (relation, concept) tuples in the orthogonal models. Inversely, the selection or de-selection of (relation, concept) tuples triggers computation of semantically equivalent concepts in the orthogonal axis. The selection or de-selection of concepts are thus directly tied to the selection or de-selection of their semantically equivalent (relation, concept) tuples. If a higher-level concept does not extensionally contain any selected concepts, then the higher-level concept is also considered to be de-selected.

The narrowest common extension in an extensional concept model is the narrowest selected concept found in the model without branching.

Selection and de-selection of concepts or (relation, concept) tuples in an OSEM may be performed automatically using concepts or (relation, concept) tuples encoded as a machine-readable set of assertions. After a set of assertions is applied to an OSEM, the remaining selected concepts represent a machine interpretation of the assertions by the OSEM. If no concepts remain selected, then one or more assertions were inconsistent. If multiple concepts remain selected, then the narrowest common extension in the concept model represents the most specific interpretation of the assertions.

Inversely, the selected (relation, concept) tuples in an OSEM may be output as a set of assertions of intensional properties. An OSEM stored with a specific set of assertions may be used as a concept filter or concept adapter.

A concept adapter may be constructed using two OSEMs with different concept models, where each concept model in the first OSEM partially overlaps with the corresponding concept model from the second OSEM. The relations in the two concept models may be different, representing different intensional definitions of concepts. A concept might be selected in the first OSEM, the assertions output from that OSEM and applied to the second OSEM, resulting in the selection or de-selection of orthogonal concepts in the second OSEM based on the different definitions of concepts. Thus, OSEMs may be used as adapters between concept models containing the same extensional concepts with different intensional definitions. Any number of different intensional definitions for concepts in a model may be adapted to the assertions exported from a single OSEM, potentially enabling precise cross-database queries by definitions of concepts or terms, instead of querying by individual terms.

A concept filter may be constructed using an OSEM with a given set of assertions. A second set of assertions may be available that describe an entity. When a concept filter receives an assertion for a new entity, it creates a second OSEM and applies each assertion for that entity to the second OSEM. When all assertions for the entity are processed, the resulting selected concepts are compared to those selected concepts in the first OSEM, and the narrowest common extension of each set of selected concepts may be tested to determine whether the entity may be classified as intensionally belonging to the first concept.

Information Extraction (IE) systems may be applied to electronic resources in a digital archive, to mine for both extensional and intensional assertions of characteristics for entities. Many such systems exist that are based on Natural Language Processing and Named-Entity recognition. Given a list of assertions generated by one of these systems, a concept filter may be applied to the assertions to detect whether the concept is contained in a particular document (concept mining), or to process all assertions about an entity contained by an entire corpus of documents (assertion mining).

A concept filter contains fixed intensional definitions of concepts with a fixed set of assertions; therefore it may be made persistent by assigning a unique identifier to the concept filter and storing it in a structured format with its assertions. When new documents are discovered that match the concept, a unique identifier for the document may be associated with the unique identifier for the concept and stored in an index (a concept-document index).

A concept index may itself be further indexed using concept adapters to produce a second index based on concepts that intensionally match a slightly different definition of concepts in a concept model (a concept-concept index). A concept-document index or concept-concept index may be queried using a concept adapter.

Two agents (human or machine) may interpret data differently based on different definitions of terms and concepts. Data normalization is performed by agents interpreting data. Two information resources may encode the same knowledge in different ways.

Differences in data representation and interpretation cannot be overcome by traditional query systems that rely on terms. Currently methods do not support multiple definitions of terms and concepts, nor for comparing and translating between different definitions. On the other hand, Orthogonal Semantic Equivalence Maps (OSEM) as disclosed herein provide methods and data structures that encode concept definitions in a machine processable form.

Information processing systems may overcome differences in data representation and interpretation using Concept Adapters and Concept Filters based on OSEMs. A system may utilize Concept Adapters to perform comparisons between concepts based on their definitions, to transform knowledge based on one concept definition into knowledge based on a different concept definition, to communicate with agents, or to interpret, normalize, or query data. A system may utilize Concept Filters to search or index electronic resources, entities, or concepts.

Figure 2:
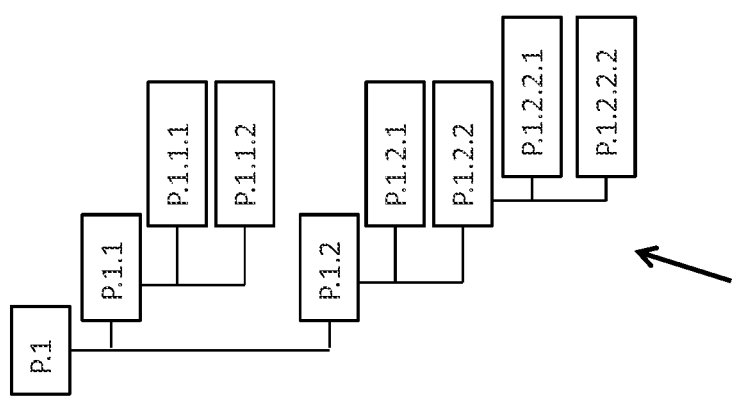
FIG. 2 shows an alternative controlled vocabulary for oxygen tolerance phenotypes for bacteria and an associated concept model. In this model, the concept for aerotolerant has been subdivided into two concepts, and the concept P.1.3 "facultative anaerobe" has been removed. Each concept in the model has a unique identifier (e.g., concept P.1.1.1), which may be associated with zero or more terms (e.g., concept P.1.2.2.2 has no label) in the vocabulary. The top level concept P.1 represents any concept in the model.
Figure 3:
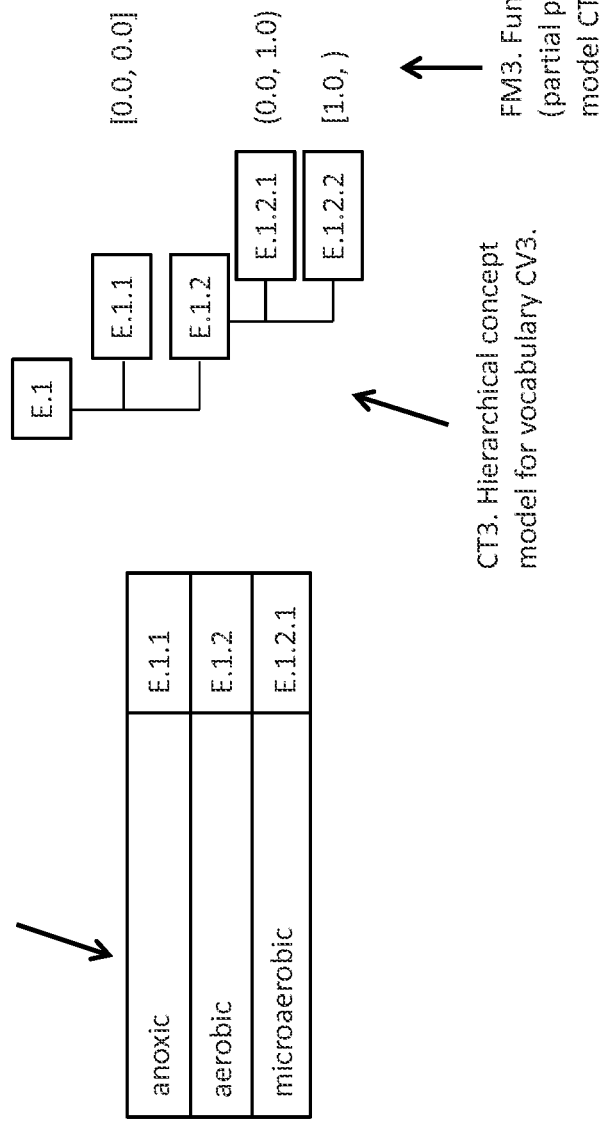
FIG. 3 shows a controlled vocabulary for environmental oxygen conditions and an associated concept model. Each concept in the model has a unique identifier (e.g., concept E.1.2.2), which may be associated with zero or more terms (e.g., E.1.2.2 has no term associated with it) in the vocabulary. Optionally (as in this figure), numeric data may be functionally mapped to concepts. For example, f(0.5) maps to concept E.1.2.1, which is labeled with the term "microaerobic". The top level concept E.1 represents any concept in the model.

An OSEM is constructed using a minimum of three independent extensional concept models. Each extensional concept model in an OSEM must have at minimum one concept, and must have one top-level concept that represents any concept in that model. Each extensional concept model may optionally have one or more vocabularies associated with it (FIG. 2, CV2). Resolution of terms to concepts may be performed using a table lookup or other method (such as a semiotic method). At any time, any terms that are mapped to individual concepts in a concept model may be retrieved and output. Each extensional concept model may optionally have one or more functional maps associated with it (FIG. 3, FM3). Resolution of numeric data to concepts may be performed using a function in a programming language or a set of rules.

An OSEM contains a set of intensional relations between two concept models over a third concept model. The nature of these relations are such that any pairwise combination of concepts in the second and third models are associated with one or more concepts in the first model. The concepts in one model of an OSEM are selectable and de-selectable (e.g., via a Boolean flag). The relations in an OSEM are also selectable and de-selectable. The selection or de-selection of a concept results in the selection or de-selection of the associated relations, and vice-versa. The selection or de-selection of a concept or relation may be performed via an assertion (a machine-readable instruction to select or de-select a concept or relation). The selected concepts and/or selected relations of an OSEM may be output at any time as a list of assertions (the "current set of assertions"). If all concepts contained by a broader (higher-level, but not top-level) concept are de-selected, then that broader concept may also be automatically de-selected. A list of assertions may be supplied to any OSEM, resulting in the selection or de-selection of any concepts and/or relations matching the assertions. Any extensional concept model may be processed to determine a single concept in that model representing the narrowest common extension of all selected concepts (FIG. 12). Any set of relations in an OSEM may also be processed to determine a relation representing a pairwise combination of the narrowest common extension of the set of concepts from the second concept model (represented in the set of relations) and the narrowest common extension of the set of concepts from the third concept model (represented in the set of relations). In this way, relations between broader (higher-level) concepts may be computed instead of stored. An OSEM may be reset, which results in the selection of all concepts and relations contained by the OSEM. An OSEM may be locked (e.g., via a Boolean flag) to prevent the selection or de-selection of concepts or relations. A locked OSEM represents a particular definition of a concept. An OSEM may be represented in a structured form amenable to storage or transfer via electronic media. An OSEM may optionally be assigned a unique identifier for storage and retrieval.

A Concept Adapter is constructed using a primary OSEM and one or more secondary OSEMs. Each agent communicating via the concept adapter must supply an additional OSEM that encodes that agent's definitions of a subset or superset of concepts present in the primary OSEM. A set of assertions may be supplied to a concept adapter, which then applies the assertions to the primary OSEM. Any assertion applied to the primary OSEM triggers the export of the current set of assertions from that OSEM, which are then applied to all secondary OSEMs. An agent may use its OSEM to recognize concepts and terms corresponding to the set of assertions from the primary OSEM.

A Concept Filter is constructed using a primary and secondary OSEM and a set of assertions. A concept filter may optionally be assigned a unique identifier or use the unique identifier of the primary OSEM. The concept filter applies the set of assertions to the primary OSEM and then locks it to prevent further changes. Each electronic resource (or an entity as an electronic resource) processed by the concept filter must be converted into a set of assertions (for instance, using Information Extraction systems or a Concept Adapter). The set of assertions for an electronic resource is supplied to the concept filter, which applies them to the secondary OSEM. The concept filter then computes narrowest common extension of the intersection between the selected concepts and relations of the primary and secondary OSEMs. The narrowest common extension is then used as determination whether the assertions provided from the electronic resource match the concept definition of the primary OSEM. The results of a match may be stored using the unique identifier for the concept filter (or primary OSEM) and a unique identifier for the electronic resource. The secondary OSEM is then reset and the concept filter continues iteration of the electronic resources.

A concept filter may alternatively accept a secondary locked OSEM to which a set of assertions has already been applied. Iteration of a set of locked OSEMs by a concept filter will match OSEMs rather than electronic resources. In this case, the results of a match may be stored using the unique identifiers of the concept filter (or primary OSEM) and the secondary OSEM.

In various embodiments, the disclosed methods may be implemented on one or more computers as part of a system. The computer system may be part of an existing computer system (e.g. on a smartphone, desktop computer, on-board computer, etc.) or may be implemented as a separate, standalone unit that is in local or remote communication with other components. The computer systems may be in wired or wireless communication with one another through a combination of local and global networks including the Internet. Each computer system may include one or more input device, output device, storage medium, and processor (e.g. a microprocessor). Input devices may include a microphone, a keyboard, a computer mouse, a touch pad, a touch screen, a digital tablet, a track ball, and the like. Output devices include a cathode-ray tube (CRT) computer monitor, a liquid-crystal display (LCD) or LED computer monitor, touch screen, speaker, and the like.

The computer system may be organized into various modules including an acquisition module, an output module, and a controller, where the controller is in communication with the acquisition module and the output module. The various modules for acquiring and processing data and for returning a result may be implemented by a single computer system or the modules may be implemented by several computer systems which are in either local or remote communication with one another.

Storage media include various types of local or remote memory devices such as a hard disk, RAM, flash memory, and other magnetic, optical, physical, or electronic memory devices. The processor may be any known computer processor for performing calculations and directing other functions for performing input, output, calculation, and display of data in accordance with the disclosed methods. In various embodiments, implementation of the disclosed invention includes generating sets of instructions and data that are stored on one or more of the storage media and operated on by a controller, where the controller may be configured to implement various embodiments of the disclosed invention.

In various embodiments, OSEMs may be constructed using a semi-automated (or machine-facilitated) approach:

1. Given a term and its definition as a sequence of text, annotate the known terms in the definition.

2. From the known terms, prompt the user to select a first, second and third annotated term from the definition for use as orthogonal concept models.

3. If available, retrieve the concept models corresponding to each selected term.

4. Create a default OSEM by generating a two dimensional matrix. Arrange the first and second concept model along orthogonal axes of a matrix.

5. Populate each cell of the matrix with a pick-list containing each concept in the third concept model.

6. Check the OSEM for ambiguous concepts (i.e. those concepts for which identical sets of intensional relations are found). Flag all ambiguous concepts.

7. Allow user to select individual concepts for each cell in the matrix.

8. Allow the user to divide, merge, add or delete concepts along any orthogonal axis. For any new concept, subdivide/copy the cells in the corresponding row or column. For any deleted or merged concept, delete or merge (via narrowest common extension) the cells in the corresponding rows or columns.

9. Upon modification of the OSEM, re-check the OSEM for ambiguous concepts.

"Curation" of information to generate assertions may be performed using a semi-automated (or machine-facilitated) approach:

Initially, an Information Extraction (IE) system (see e.g. Chang et al. 2006) may be used to process the textual content of a document into zero or more assertions as follows:

1. Use Named-Entity Recognition to identify an entity in the resource (e.g., Garrity and Lyons, U.S. Pat. No. 7,925,444), based on vocabularies associated with the three supplied concept models.

2. Use a Relationship Extraction algorithm to identify relations between entities (Aggarwal et al., 2012).

3. Produce an assertion of the form (Entity1, (Relation, Entity2)).

For existing normalized data resources, assertions may be automatically generated as in Example 2B below.

The following non-limiting Examples are intended to be purely illustrative, and show specific experiments that were carried out in accordance with embodiments of the invention:

EXAMPLES

Example 1

Example 1. Application of OSEM to database curation.
Example 1A. The traditional approach.

A database curator is tasked to curate phenotypic data for bacteria, directly from the scientific literature. A bacterial strain ("strain X") is described as follows in the scientific literature (Assertion 1):

"Strain X grows in a partial pressure of oxygen of 0.4."

In a relational database, the following domain vocabulary is available to describe the oxygen tolerance of bacterial strains:

aerobe
strict aerobe
microaerophilic
anaerobe
obligate anaerobe
aerotolerant
microaerotolerant As part of the curation process, the curator must categorize strain X using one of the above labels (i.e. select the domain vocabulary) based on Assertion 1. The vocabulary is derived from the terms present in the oxygen tolerance SKOS model (FIG. 2). However, a relational database table has no inherent ability to represent domain codes based on the structure of hierarchical (intensional) vocabularies containing narrower or broader terms because relational tables are row-based (extensional) and concepts are stored as a "flat" list.

The curator must assign a phenotype to strain X based on the above list and the currently available information. However, the limited amount of information could be interpreted to mean that strain X has one of several different phenotypes ("microaerotolerant", "microaerophilic", or "aerotolerant"). The curator interprets the description to mean that strain X is "microaerotolerant".

Later, an additional piece of information about the "strain X" becomes available (Assertion 2):

"Strain X does not grow in anoxic conditions."

Now the curator must make a decision on how to reconcile "microaerotolerant" with "does not grow in anoxic conditions". The definitions of the two terms conflict because "does not grow in anoxic conditions" implies an "aerobe", but the strain is currently labeled as "microaerotolerant", which is an "anaerobe". The original precise description "grows in a partial pressure of oxygen of 0.4" has been lost due to normalization and interpretation as "microaerotolerant". There is no term available in the vocabulary that can be used to represent both of these concepts.

Example 1B. Using an OSEM system to assist database curation.

Figure 4:
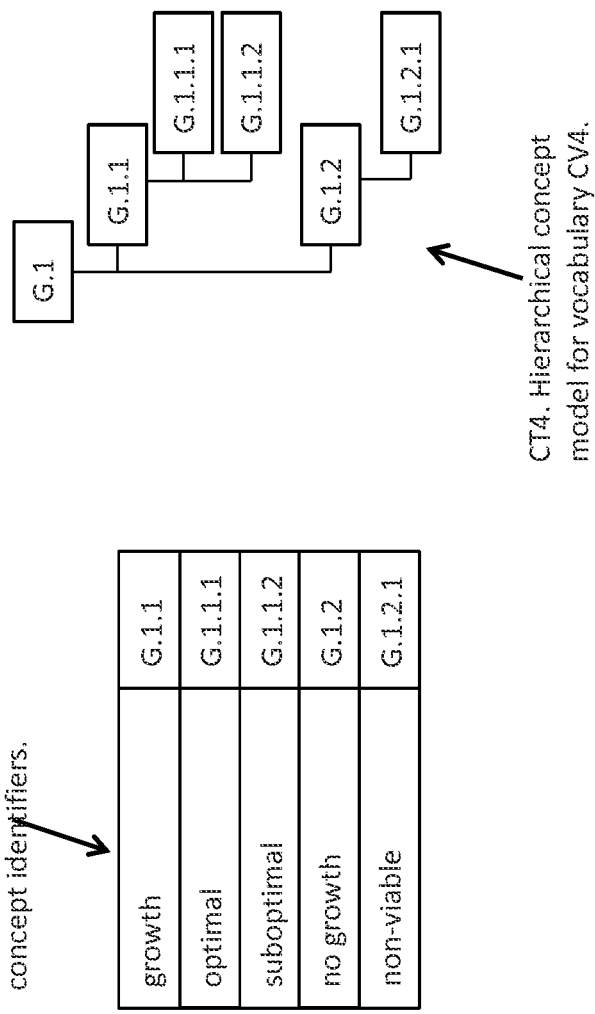
FIG. 4 shows a controlled vocabulary for growth observations and an associated concept model. Each concept in the model has a unique identifier (e.g., concept G.1.2), which may be associated with zero or more terms (e.g., G.1.2 is associated with the term "no growth") in the vocabulary. The top level concept G.1 represents any concept in the model.

An alternative to the above method of storing and querying normalized interpretations of data is to employ an OSEM to perform interpretation of the data during query. In this example, an OSEM is provided (e.g. an OSEM constructed by a domain expert) using three independent concept models representing an environmental condition ("E", environmental oxygen), an observation ("G", growth), and an interpretation ("P", oxygen tolerance phenotype). In this case, a function may also be assigned to concept axis E that forward maps quantitative data (partial pressures of oxygen as floating-point numbers) to the appropriate qualitative concept (or set of concepts) in concept model E; for example, this may be designated using the notation "E.1 (0.4)" as shown below. The root concept of any hierarchy (i.e., E.1, P.1, G.1) may be used to represent "any concept" within that concept model. These three concept models may then be arranged along orthogonal axes as depicted in the OSEM shown in FIG. 5. That is, the growth observations in CV4 (FIG. 4) may be combined with the oxygen tolerance phenotype observations in CV2 (FIG. 2) and the environmental oxygen conditions in CV3 (FIG. 3) to produce OSEM5 (FIG. 5). Orthogonal semantic relations are established from concept axis P (oxygen tolerance phenotype) to concept axis E (environmental oxygen) over concept model G. FIG. 5 depicts a complete OSEM that may be used for deriving semantically equivalent concepts for oxygen tolerance of a bacterial strain over relations between environmental conditions and growth. Many alternative OSEMs could be constructed that encode variations of these semantic relations and produce similar results.

When performing operations (e.g., producing definitions or tests for concept containment) on a single concept model (one axis of an OSEM), the extensional containment method is used. When performing orthogonal operations (producing definitions or tests for concept containment over relations), the intensional containment is used.

Any OSEM may be checked for completeness by testing that for each narrowest concept in a concept model, a relation exists to each narrowest concept in the orthogonal concept model, including relations over intensional containment (via higher level concepts).

Figure 6:
FIG. 6 shows an Orthogonal Semantic Equivalence Map (OSEM) that provides a mapping between orthogonal concept models from FIGS. 2, 3, and 4.

Any OSEM may be tested for ambiguity or imprecision by searching for sets of concepts along either axis that have an identical set of relations to the orthogonal concept model. If two or more concepts in a single model are found that have identical sets of relations to the orthogonal concept model, those concepts may be flagged as ambiguous. In some terminologies (FIG. 1), such ambiguities do occur (i.e., P.1.2.2 and P.1.3 are ambiguous in this OSEM because they have identical reduced sets of relations). In such cases, the concept may be deleted (P.1.3 "facultative anaerobe" would require an additional axis for oxygen utilization, and so is excluded from this narrowly-focused concept model) or an additional unnamed concept might be created by subdividing a concept in the orthogonal or relational axis to provide additional relations that may be used to distinguish the ambiguous concepts from each other. An appropriate term or description may optionally be assigned to the new concept. For instance, the concept P.1.2.2 "aerotolerant" may be subdivided into multiple concepts P.1.2.2.1 (unnamed concept) and P.1.2.2.2 "microaerotolerant". FIG. 6 depicts an alternative OSEM that results from the above operations on OSEM5, controlled vocabulary CV1 and concept model CT1 to produce OSEM6, CV2 and CT2.

For Assertion 1, a "partial pressure of oxygen of 0.4" may be converted to a functional mapping "E.1(0.4)" and "grows" can be resolved to concept G.1.1 (and its narrower terms G.1.1.1 "optimal" and G.1.1.2 "suboptimal"). Instead of storing the interpretation "microaerotolerant", the curator instead stores Assertion 1 (strain X', (G.1.1, 'E.1(0.4)')).

A concept filter utilizing OSEM6, given Assertion 1 ('strain X', (G.1.1, 'E.1(0.4)')), could perform the following steps:

Instantiate a new concept filter containing the OSEM. By default, all concepts along the P axis are selected.

Resolve any functional mappings or terms to appropriate concepts.

Functionally map 'E.1(0.4)' to concept E.1.2.1 to obtain Assertion 1 ('strain X', (G.1.1, E.1.2.1)).

Figure 7:
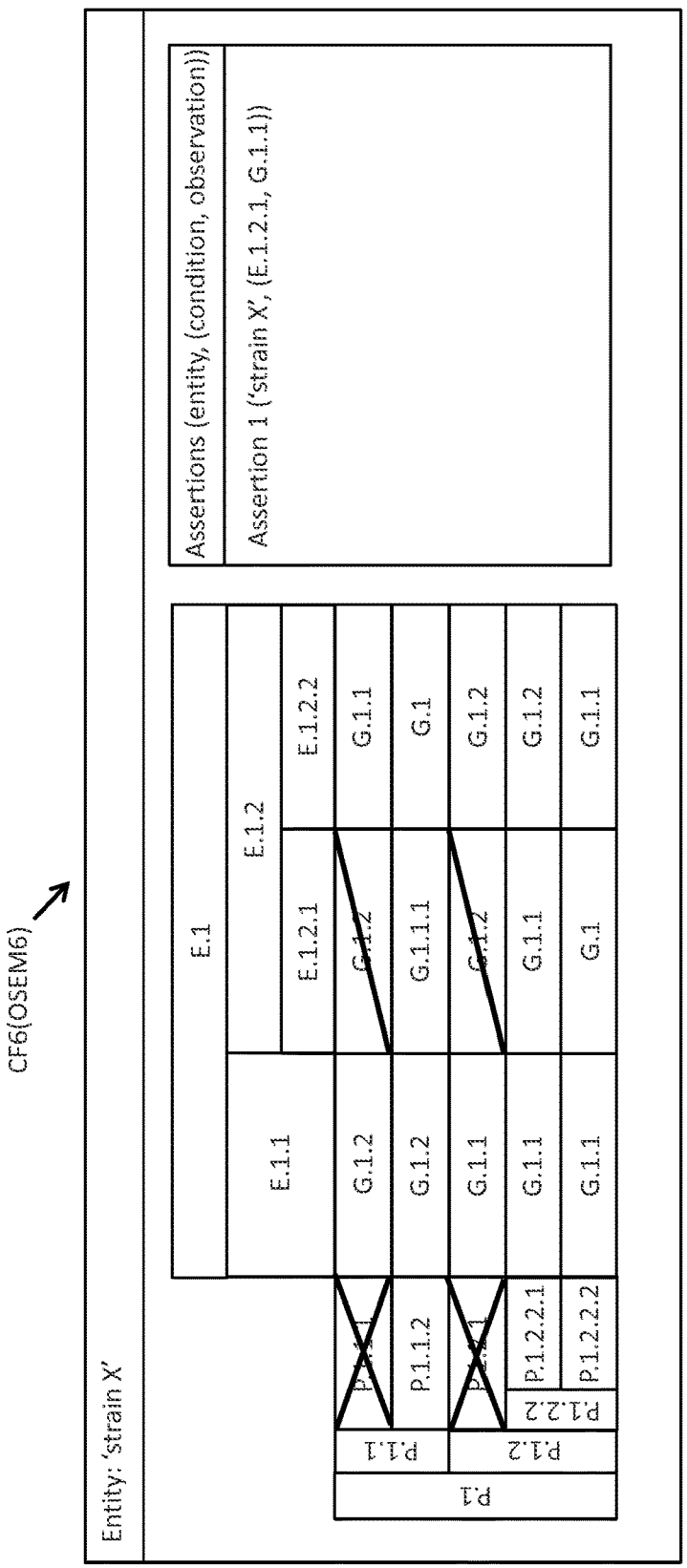
FIG. 7 shows Example 1B, step 3. Using OSEM6 as a concept filter by applying an assertion. Concepts P.1.1.1 and P.1.2.1 are de-selected because they do not satisfy intensional containment of the assertion (E.1.2.1, G.1.1).

De-select any concepts along the P axis that do not satisfy intensional containment of the pairwise combination of the extensional containment of E.1.2.1 {E.1.2.1} and the extensional containment of G.1.1 {G.1.1, G.1.1.1, G.1.1.2}. For instance, intensional containment is not satisfied for concept P.1.1.1 because its relation to the extensional containment of E.1.2.1 is G.1.2, which is not within the extensional containment of G.1.1. See FIG. 7.

De-select any concepts along the P axis that do not extensionally contain any selected concepts. This could be implemented in several different ways (e.g., by recursion, depth-first tree walking or by a reference counter for each concept).

Produce a list of selected concepts from the P axis: {P.1, P.1.1, P.1.1.2, P.1.2, P.1.2.2, P.1.2.2.1, P.1.2.2.2}.

The concept filter produces a list of seven matching concepts (i.e. the matching narrowest concepts and the broader concepts that extensionally contain them). If the resulting list was empty, the concept filter may flag the assertions as being inconsistent or conflicting, alerting the database curator to a problem in the data.

If the list is non-empty, the concept filter may then traverse the remaining concept hierarchy to determine the Narrowest Common Extension that covers the list of selected concepts. This may be performed using any of a number of existing algorithms to solve the lowest common ancestor (LCA) problem (or least common subsumer if implemented in an ontology). A label for the narrowest matching concept may be output as the most appropriate term for the entity (strain X).

If a single common parent concept cannot be determined (or if the single common parent concept is "all concepts", as in this case (P.1)), the concept filter may flag the entity (strain X) as being incompletely described.

For Assertion 2, the term "anoxic" may be resolved to concept E.1.1 and "does not grow" may be resolved to concept G.1.2. Instead of storing the interpretation "aerobic", the curator stores the additional assertion ('strain X', ('does not grow', 'anoxic')), or may alternatively store the assertion as pre-resolved concept identifiers ('strain X', (G.1.2, E.1.1)).

A concept filter utilizing the OSEM, having already processed Assertion 1, is next given Assertion 2 ('strain X', ('does not grow', 'anoxic')), and performs the following steps:

Resolve any functional mappings or terms to appropriate concepts.

Resolve 'anoxic' to concept 'E1.1' to obtain Assertion 2 ('strain X', ('does not grow', E.1.1)).

Resolve 'does not grow' to concept 'G.1.2' to obtain Assertion 2 ('strain X', (G.1.2, E.1.1)).

Figure 8:
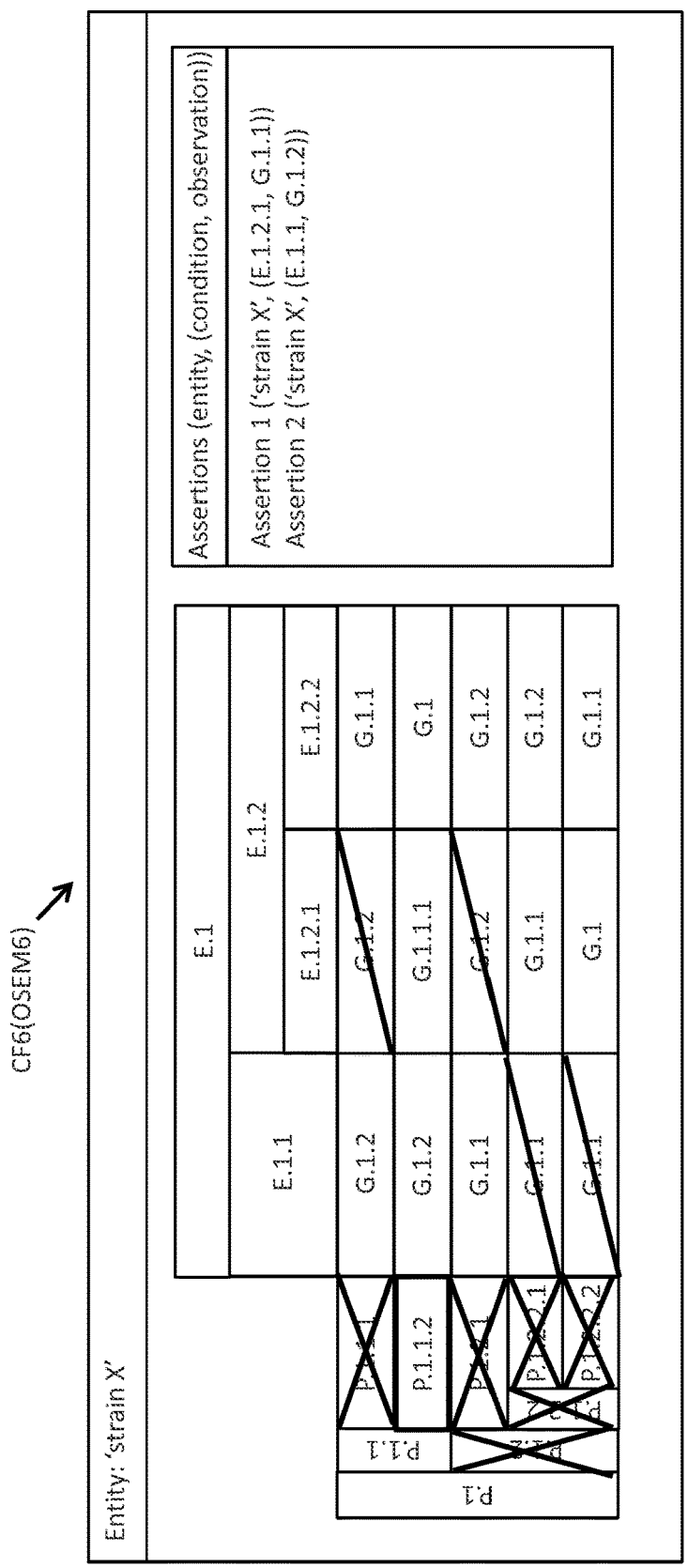
FIG. 8 shows Example 1B, step 7. Using OSEM6 as a concept filter by applying a second assertion. Concepts P.1.2.2.1 and P.1.2.2.2 do not satisfy intensional containment of the assertion (E.1.1, G.1.2) and are de-selected. Concepts P.1.2.2 and P.1.2 are also de-selected because they no longer extensionally contain any selected concepts. The concepts P.1, P.1.1 and P.1.1.2 are the only remaining selected concepts that satisfy both assertions. The narrowest common extension of the selected concepts is P.1.1.2.

De-select any concepts along the P axis that do not satisfy intensional containment of the extensional containment of E.1.1 {E.1.1} and the extensional containment of G.1.2 {G.1.2, G.1.2.1}. See FIG. 8.

De-select any concepts along the P axis that do not extensionally contain any selected concepts.

Produce a list of selected concepts from the P axis: {P.1, P.1.1, P.1.1.2}.

Determine the narrowest selected concept that is extensionally contained by a single branch of concept taxonomy P: {P1.1.2}. Output the preferred label (skos:prefLabel) of this concept as the most appropriate label for the oxygen tolerance phenotype of strain X.

After processing both assertions, the remaining concepts are P.1 "any concept", P.1.1 "aerobic", and P.1.1.2 "microaerophilic". The system employing the concept filter and OSEM arrived at a precise narrow concept, P.1.1.2 "microaerophilic" as the oxygen tolerance phenotype of strain X.

The concept filter could process any number of additional oxygen tolerance assertions for strain X, further refining the concept if needed, and flagging assertions as inconsistent if no concepts are selected by the concept filter.

Example 2

Example 2. Application of OSEM to database query.

Example 2A. Querying a relational database using the traditional method.

Assume that a database curator has inserted the following record into a relational database which includes a table, referred to as "oxygen_tolerance", which includes as elements the name of a bacterial strain and a label indicating its oxygen tolerance:

INSERT INTO oxygen_tolerance VALUES ('strain Y', 'microaerotolerant');

1 row(s) inserted

Later, this relational database is queried via SQL for bacterial strains that are "anaerobes". The query does not return "strain Y" in the result set because it is marked as "microaerotolerant", despite "microaerotolerant" being a narrower term for "anaerobe". A relational database table has no inherent ability to query hierarchical vocabularies based on narrower or broader terms. A query as shown below would return no results:
SELECT FROM oxygen_tolerance WHERE phenotype='anaerobe';
0 row(s) returned Furthermore, it is not possible to query the oxygen_tolerance table using quantitative data with traditional relational database queries (e.g., SELECT strains that grow in >0 oxygen) because the database contains only qualitative data.

Example 2B. Querying a relational database using OSEM to interpret queries.

However, a relational database query that is based on an OSEM would be able to respond to the query of Example 2A, as disclosed below.

A robust query for oxygen phenotype terms should take into account the concept hierarchy of the domain vocabulary as depicted in CV2 in FIG. 2. The OSEM in FIG. 6 from the previous example is re-used in this example.

For each record in the oxygen_tolerance table, an OSEM (i.e. OSEM6) may be applied as a query that takes into account the concept hierarchy of the domain vocabulary depicted in FIG. 2. A concept filter may be created using the above OSEM, and the single input term 'aerobe' may be applied as an assertion to the concept filter. The concept filter performs the following steps (the inverse orthogonal mapping):

1. Create an empty list of assertions.
2. Resolve "aerobe" to concept P.1.1.
3. For the selected concept P.1.1, produce a list of extensionally contained concepts as a concept set P_prime={P.1.1.1, P.1.1.2}.
4. For each concept E_prime on the orthogonal concept axis E ({E.1, E.1.1, E.1.2, E.1.2.1, E.1.2.2}):
   a. Produce the unique set of relations G_prime from concept set P_prime to concept E_prime (e.g., the fourth iteration E_prime=E.1.2.1 would produce the set G_prime={G.1.2, G.1.1.1}). If no relation exists (such as for higher level concepts), produce an empty set. That is, for the set P_prime (which designates a series of rows in the table of FIG. 7) and the set E_prime=E.1.2.1 (which designates the columns), the set G_prime is specified as shown according to which rows and columns are selected.
   b. From the set of relations G_prime, determine the Narrowest Common Extension (NCE) that extensionally contains all members of G_prime. Let this concept be G_assert (e.g., the fourth iteration would produce G_assert=NCE{G.1.2, G.1.1.1}=G.1).
   c. If E_prime is a higher level concept, determine the G_assert based on the Narrowest Common Extension for G_assert of all of the lower level concepts extensionally contained by said higher level concept.
   d. Add the tuple (G_assert, E_prime) to the list of assertions (e.g., the fourth iteration would add the tuple (G.1, E.1.2.1)).

The resulting assertions are the following tuples:
Assertions_2B={(G.1, E.1), (G.1.2, E.1.1), (G.1, E.1.2), (G.1, E.1.2.1), (G.1, E.1.2.2)}

5. Instantiate a new concept filter CF6 using OSEM6.
6. Apply the list of assertions Assertions_2B to the new concept filter as in Example 1B.
7. Lock the concept filter (e.g., set a flag so that it may not be modified).
8. Obtain the output labels for the selected concepts along the P concept axis as in Example 1B. The resulting labels will be: CF6_P_labels={"aerobe", "obligate aerobe", "strict aerobe", "microaerophilic"}.

9. For each record in the oxygen_tolerance table:
   a. Fetch the values of the strain and phenotype fields (e.g., ("strain X", "anaerobe"), ("strain Z", "strict aerobe")).
   b. Test if the phenotype value matches (exists in) the output labels of concept filter CF6.
   c. If the phenotype value matches the concept filter, add the strain to the result set.

Output the result set (e.g., "strain Z").

The concept query for relational databases could be implemented in several ways:

In a database driver (e.g., JDBC driver, ODBC driver) in order to enable OSEM-based queries using standard APIs.

Encoded as a stored procedure (or as a Java Stored Procedure in Oracle).

Encoded in a procedural programming language to be executed within an application.

The above steps may be optimized (e.g., by using a depth-first approach to traverse concept model E in step 4, by using a hash map for fast lookups in the output labels in step 9).

Example 3

Example 3. Using OSEM as an adapter between two information resources with different concept models.

Two separately curated relational databases (RDB1 and RDB2) contain similar normalized data about oxygen tolerance of organisms, but the definitions of the terms used in either database are not the same, thus consistent federated queries that utilize both databases cannot be performed over the record values. For example, the SQL query "SELECT strain FROM oxygen_tolerance WHERE phenotype IN {'anaerobe'}" will execute and return results for both databases, but those results will be based on different concepts for the term "anaerobe" that are incompatible.

The first database (RDB1) stores normalized phenotypic terms corresponding to the concept model of Example 1A (FIG. 2). The second database (RDB2) stores normalized terms corresponding to the P.1 concept model of the vertical concept axis of the OSEM depicted in FIG. 9. The incompatibility between concept definitions in these two models is more apparent when OSEM2 of FIG. 2 is reduced to OSEM10 depicted in FIG. 10 by using only the concepts from the concept model in FIG. 9.

A concept filter CF1 for querying RDB1 may be instantiated using OSEM2, and a second concept filter CF2 for querying RDB2 may be instantiated using OSEM9. A third concept filter CF3 may be instantiated using one of OSEM2, OSEM8, or a different OSEM representing the same concept models with a different set of semantic relations. CF3 will then be used as a Concept-Concept query as follows:

The third concept filter CF3 may then be configured as in the previous example (by supplying a set of assertions to the filter) and locked (i.e., setting a flag on the filter that prevents additional assertions from being set). The selected concepts in the filter may then be converted to the semantically equivalent set of assertions (Assertion 1 (G.1.1, E.1.1) "grows in anoxic conditions"; Assertion 2 (G.1, E.1.2) "any growth observation for oxygen >0"). In Assertion 2, the concept G.1 is the broadest concept of the Growth Observation concept model, essentially a wildcard that means "any observation". This set of assertions is then applied to both concept filter CF1 and CF2, which in turn output the term (or set of terms) representing the semantically equivalent concepts for each filter (concept filter CF1 produces {"anaerobe", "obligate anaerobe", "strict anaerobe", "aerotolerant"} and concept filter CF2 produces {"anaerobe", "facultative anaerobe"}. The terms output from CF1 and CF2 are then used to generate extensional SQL queries against RDB1 and RDB2, respectfully, as follows:

RDB1 SQL Query SQL1:
SELECT strain FROM oxygen_tolerance WHERE phenotype IN {'anaerobe', 'obligate anaerobe', 'strict anaerobe', 'aerotolerant'};
RDB2 SQL Query SQL2:
SELECT strain FROM oxygen_tolerance WHERE phenotype IN {'anaerobe', 'facultative anaerobe'};

The results of the two extensional queries SQL1 and SQL2 will both produce result sets containing records that match the concept of "anaerobe" as defined by concept filter CF3.

The above technique could also be applied to importing records from RDB1 into RDB2, or for exporting records to correspond to a different concept model (such as a concept model compatible with a particular RDF triple store used by an ontology).

Example 4

Example 4. Orthogonal Semantic Equivalence Mapping for annotating, classifying, and querying electronic documents or entity metadata using language applicable to a specific field.

Example 4 discloses a computing system configured to use Orthogonal Semantic Equivalence Mapping for annotating, classifying and querying electronic documents or entity metadata using language applicable to a specific field. For instance, a client (human or software agent) may wish to query a full text index of a corpus of agricultural literature using concepts represented in the AGROVOC thesaurus (a SKOS thesaurus for agriculturally relevant concepts, see Morshed et al. 2010). Specifically, the client may execute a search for AGROVOC concept 34317, which has the label "Pathogenic bacteria". A traditional keyword search returns only documents containing the terms "Pathogenic" and/or "bacteria", but the search does not return documents that only mention entities that are pathogenic bacteria, or documents that only mention diseases caused by pathogenic bacteria. However, a complete search for the concept "Pathogenic bacteria" should include the names of all bacteria that cause disease, as well as the diseases they cause.

A query system that relies on OSEM provides the ability to define the concept "Pathogenic bacteria" as being semantically equivalent to a set of names of bacterial taxa over an orthogonal concept model representing pathogenicity, which is in turn orthogonal to a "host" concept model. Adapting the method of Example 2, a concept filter CF4 utilizing this OSEM may be given a set of assertions that define AGROVOC concept 34317, "Pathogenic bacteria". This concept filter will consider any bacterial names that are orthogonally related to a specific disease in a host as also being semantically equivalent to "Pathogenic bacteria". Further, if the "host" concept model additionally includes a taxonomy of higher-level taxa that distinguishes between taxonomic groups of organisms, the concept filter can also be configured to recognize the concept "Pathogenic bacteria" as being specific to agriculturally relevant hosts, and to distinguish other concepts such as "phytopathogenic bacteria" (plant pathogens).

An Orthogonal Semantic Equivalence Mapping is constructed with orthogonal concept models for infectious agent, host, and virulence/disease.

a. Concept Annotation

Concept filter CF4 ("pathogenic bacteria") can be applied to any document in a corpus to test whether the n-grams contained in the document satisfy (match) the concept filter. As semantically equivalent concepts that match CF4 are identified in the text, they may be annotated using one or more of the equivalent terms (or unique identifiers) for the concept. For instance, if the bacterial name "*Agrobacterium tumefaciens*" is identified in a document using Named-Entity Recognition, it may be annotated with the identifier for the bacterial species (i.e., 10.1601/nm.1311) or alternatively the concept identifier for "Pathogenic bacteria" in AGROVOC (i.e., AGROVOC Term Code: 34317). An annotated document may be annotated in memory (such as in the DOM (document object model) of an XML or HTML document and optionally returned to the agent as a modified document.

b. Text Indexing

As concepts are recognized in the text content of individual documents in the corpus in Example 4a, the identifier (URL or persistent identifier) of any matching digital resources may be summarized as a list and returned to the client.

Optionally, these lists of matching documents may be stored in an index (e.g., an inverted index). However, unlike traditional indices that store relations between keywords and documents, using concept filters it is possible to store relations between concepts and documents. For instance, a concept filter that has been adjusted for a particular concept (e.g., "Pathogenic bacteria") and has been locked may be assigned a persistent identifier (e.g., 10.1601/agrovoc.34317) and stored in a serialized (structured) format as a resource that may be resolved and retrieved using that persistent identifier. The matching document identifiers may then be stored in an index with the persistent identifier for the serialized concept filter, resulting in a concept index instead of a keyword index.

c. Concept Taxonomies

A taxonomy of concepts may be established by linking the persistent identifiers for stored concept filters together in a hierarchy. In this way, it is possible to construct multiple taxonomic views that represent different, overlapping hierarchies and contain different concept definitions (e.g., catalogue views of agricultural products may be organized differently and define concepts differently for different markets).

d. Concept Indexing and Query

A simple query of the index constructed in Example 4 b might use the persistent identifier of a concept filter to query the index for related documents. However, as demonstrated in Example 3, a Concept-Concept filter may be instantiated that queries the serialized concepts rather than the index itself. The filter may be tuned to any concept using a set of assertions or a single term, and then applied to the set of indexed concepts. This concept filter in turn may also be assigned a persistent identifier and stored in the index (or in a separate concept-concept index) with the list of matching concepts. Using this method, concepts may be indexed and queried independently from textual content, or in combination with textual content.

The OSEM in this example may be extended with additional dimensions to define the concept model for Pathogenicity (a measure of how pathogenic a particular agent is for a particular disease in a particular host) using an OSEM with orthogonal concept models representing other features of the host concept model (e.g., age, sex, health, immunity, resistance, etc.).

Example 5

Example 5. Content Management System for Use with Online Courses for Serving Homework Problems.

A content management system is used by online courses for serving homework problems (as electronic documents). The topics covered in each course vary in depth or breadth of the subject matter depending on the individual instructor teaching it. This requires a unique set of homework problems for each topic covered in the syllabus.

A course management system may rely on OSEM to index and query individual homework problems by concept as in Example 4. Any topic (concept) covered in the syllabus for a course may be defined as a concept filter for querying homework problems. If the syllabus is organized as a hierarchical concept model, it may optionally be checked for consistency by querying different branches of the hierarchy for concepts matching other branches of the hierarchy by applying Concept-Concept filters using the method described in Example 3. Concepts introduced in later parts of the syllabus that do not match in part any concepts in earlier parts of the syllabus may be flagged as inconsistent.

Example 6

Example 6. A handheld medical diagnostic device in a clinical environment that is configured to use Orthogonal Semantic Equivalence Mapping to detect constraint violations and flag incomplete (or missing) and/or inconsistent information in a patient record.

For instance, in the case of an emergency room patient, a diagnostic device may collect and analyze data from a variety of sources: the transcription of an initial emergency phone call ("18 year old male complaining of heart fluttering"), data collected by medical technicians during an ambulance ride ("fast heart rate, irregular heart beat"), data collected by a cardiac monitor in an emergency room ("heart rate=132 bpm, AF") and from an EKG ("ventricular fibrillation").

The above example contains several conflicting pieces of data, but none of the recorded data is normalized to be comparable, and it is recorded at several different levels of abstraction. A traditional rule-based expert system may be able to detect conflicts in this recorded data for specific cases (e.g., AF!=ventricular fibrillation). However, a system utilizing OSEM can (in addition to detecting conflicts in recorded data) be employed to derive the nature of the conflict based on the definition of the heart rhythm concepts along several orthogonal vocabularies: age, heart rate, location in heart. This could be extended to additional dimensions by including other orthogonal vocabularies (e.g., electrical signal, disease/condition). By supporting a functional mapping of age from a patient record and heart rate from a cardiac monitor into a heart rate concept model (and resolving to the concept "normal heart rate"), an OSEM that is additionally given the assertion of the concept "tachycardia" would produce no matching concepts and would therefore flag the assertions as inconsistent.

Figure 11:
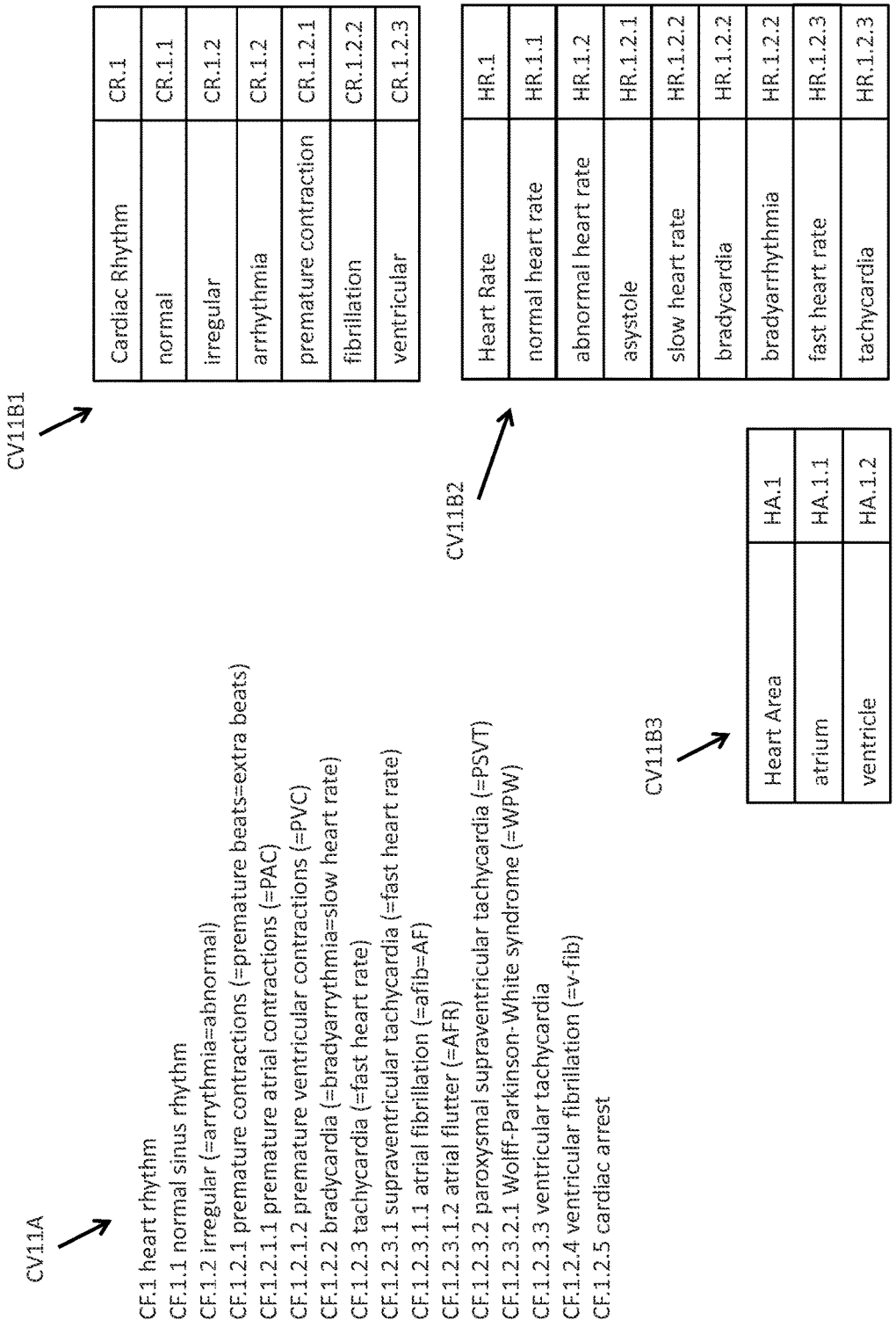
FIG. 11 shows a comparison of a single concept vocabulary (CV11A) and an alternative set of three orthogonal concept models (CV11B1, CV11B2, CV11B3) describing cardiac function. Note that a single extensional concept model (CV11A) cannot classify irregular heartbeats based both on location in the heart and on heart rate because it results in an inconsistent hierarchy with high level terms carrying overloaded extensional meanings (multiple classifications). The alternative set of three orthogonal concept models (CV11B1, CV11B2, CV11B3) represent extensional hierarchies that may be used in OSEMs.

In the above example, several variations of terminology are used which correspond to a hierarchical vocabulary model (FIG. 11).

REFERENCES

Each of the following references is herein incorporated by reference in its entirety:

U.S. Pat. No. 7,925,444 Systems and methods for resolving ambiguity between names and entities U.S. application Ser. No. 13/478,973 Semiotic Indexing of Digital Resources US 2010/0198841 A1 Systems and methods for automatically identifying and linking names in digital resources Chia-Hui Chang, Mohammed Kayed, Moheb Ramzy Girgis, Khaled Shaalan. 2006. A Survey of Web Information Extraction Systems. IEEE Transactions on Knowledge and Data Engineering 18(10):1411-1428. doi:10.1109/TKDE.2006.152.

Ahsan Morshed, Johannes Keizer, Gudrun Johannsen, Armando Stellato and Caterina Caracciolo. From AGROVOC OWL Model towards AGROVOC SKOS Model, 2010.

Aggarwal, Chant C., and Cheng-Xiang Zhai. Mining text data. Springer, 2012.

Various features and advantages of the invention are set forth in the following claims.

What is claimed is:

1. A method for establishing semantic equivalence between a plurality of concepts, comprising the steps of:
   a. providing an Orthogonal Semantic Equivalence Map in which first, second, and third extensional concept models are related to one another such that the second concept model is orthogonal to the first concept model and the third extensional concept model is distinct from the first and second concept models, wherein each concept from the first concept model has an intensional relation to one concept from the second concept model over one concept in the third concept model as a (relation, concept) pair, wherein each concept represented in the first concept model is selectable or de-selectable, and wherein each intensional relation between concepts in the first and second concept model is selectable or de-selectable;
   b. at least one of selecting or de-selecting a concept in the first concept model;
   c. at least one of selecting or de-selecting a (relation, concept) pair representing an intensional relation from a concept in the first concept model to a concept in the second concept model over a concept in the third concept model;
   d. based on the at least one of selecting or de-selecting a concept in the first concept model, determining a subset of intensional relations from the selected concepts in the first concept model to concepts in the second concept model;
   e. based on the at least one of selecting or de-selecting a (relation, concept) pair representing and intensional relation over a concept in the third concept model, determining a set of concepts from the first concept model that are related to concepts in the second concept model over the selected (relation, concept) pairs,
   f. based on the set of selected (relation, concept) pairs, determining a set of deselected (relation, concept) pairs; and
   g. determining at least one of the narrowest common extension of the set of concepts from the first, second, or third concept models that are related over the selected intensional relations, wherein the narrowest common extension of the selected concepts from the first concept model is designated as being semantically equivalent to the set of selected (relation, concept) pairs relating each selected concept from the first concept model to a concept in the second concept model.

2. The method of claim 1, further comprising simplifying the set of selected (relation, concept) pairs comprising substituting a plurality of (relation, concept) pairs with a single (relation, concept) pair comprising a relation over the narrowest common extension of the subset of concepts from the third concept model represented in the subset of (relation, concept) pairs and the narrowest common extension of the subset of concepts from the second concept model represented in the subset of (relation, concept) pairs.

3. The method of claim 1, further comprising processing the Orthogonal Semantic Equivalence Map to produce a plurality of assertions comprising at least one of the set of selected (relation, concept) pairs and the set of de-selected (relation, concept) pairs.

4. The method of claim 3, wherein the description of one characteristic of an entity comprises a set of assertions of intensional properties of the entity, wherein each assertion includes one of:
   a. a concept in the first concept model;
   b. a name, term, label, phrase, or identifier for a concept in the first concept model;
   c. a tuple having a format (entity, (relation, concept)), wherein the concept is in the second concept model, and wherein the relation is a relation over a concept in the third concept model;
   d. a tuple having a format (entity, (relation, function (parameters))), wherein the function maps the parameters to a concept in the second concept model, and wherein the relation is a relation over a concept in the third concept model;
   e. a tuple having a format (entity, (relation, text)), wherein the text is a name, term, label, phrase, or identifier for a concept in the second concept model, and wherein the relation is a relation over a concept in the third concept model; or
   f. a tuple having a format (entity, (first text, second text)), wherein the first text is a name, term, label, phrase, or identifier for a concept in the third concept model, and wherein the second text is a name, term, label, phrase, or identifier for a concept in the second concept model;
   the method further comprising
   g. constructing a concept filter having a second Orthogonal Semantic Equivalence Map,
   h. using the concept filter, applying the set of assertions of intensional properties to the second Orthogonal Semantic Equivalence Map to produce an intersection of the selected concepts from the first concept models for the first Orthogonal Semantic Equivalence Map and the second Orthogonal Semantic Equivalence Map,
   i. using the concept filter, determining the narrowest common extension of the intersection, and
   j. if the narrowest common extension is not a top level concept, designating the entity as matching the concept filter over the first Orthogonal Semantic Equivalence Map.

5. The method of claim 4 wherein the concept filter is assigned a unique identifier, stored in a structured format in a storage medium, and is retrievable using the unique identifier.

6. The method of claim 5, further comprising a corpus comprising a plurality of electronic resources each comprising textual content, wherein, for each electronic resource in the corpus, the method further comprises
   a) using one or more Information Extraction systems to recognize within the textual content at least one name, term, label, or identifier of an entity and at least one name, term, label, or identifier of concepts from the first, second, and third concept set corresponding to the entity and to produce a set of assertions for the entity, and
   b) resolving the concepts represented by the identified names, terms, labels, or identifiers to semantically equivalent concepts in a target concept set selected from the first, second, and third concept sets.

7. The method of claim 6, further comprising modifying the textual content by substituting the at least one name, term, label, or identifier identified in a) with a name, term, label, or identifier mapped to semantically equivalent concepts identified in b).

8. The method of claim 7, further comprising modifying the textual content by embedding a tag, attribute, link, or metadata comprising a name, term, label, or identifier mapped to semantically equivalent concepts identified in b).

9. The method of claim 8, further comprising producing a list comprising all semantically equivalent concepts identified in the textual content.

10. The method of claim 9, further comprising
    determining a narrowest common extension of an intersection of a list of semantically equivalent concepts identified in textual content of a first electronic document and a list of semantically equivalent concepts identified in textual content of a second electronic document, and
    using the resulting concept, placing the first and second electronic documents in a group identified by the resulting concept.

11. The method of claim 10, further comprising storing a persistent identifier of one or more concept filters in an index with the electronic documents in which the semantically equivalent concepts were identified.

12. The method of claim 11, further comprising creating a second concept filter by applying the first set of assertions comprising terms, concepts, or tuples of concepts and relations to select or de-select semantically equivalent concepts in a second Orthogonal Semantic Equivalence Map, and storing the second concept filter in an index with the identifiers of matching documents.

13. The method of claim 12, further comprising creating a third concept filter using a second set of assertions comprising terms, concepts, or tuples of concepts and relations to select or deselect semantically equivalent concepts in a third Orthogonal Semantic Equivalence Map, and using the assertions or selected concepts from the third concept filter to match the first or second concept filters.

14. The method of claim 13, further comprising storing a persistent identifier for the third concept filter with a list of persistent identifiers for identifying at least one of the first concept filter and the second concept filter which matched the third concept filter.

15. The method of claim 4, wherein the description of a characteristic of an entity further comprises a second set of assertions of intensional properties of the entity, wherein each assertion includes one of:
    a. a concept in the first concept model;
    b. a name, term, label, phrase, or identifier for a concept in the first concept model;
    c. a tuple having a format (entity, (relation, concept)), wherein the concept is in the second concept model, and wherein the relation is a relation over a concept in the third concept model;
    d. a tuple having a format (entity, (relation, function (parameters))), wherein the function maps the parameters to a concept in the second concept model, and wherein the relation is a relation over a concept in the third concept model;

e. a tuple having a format (entity, (relation, text)), wherein the text is a name, term, label, phrase, or identifier for a concept in the second concept model, and wherein the relation is a relation over a concept in the third concept model; or f. a tuple having a format (entity, (first text, second text)), where the first text is a name, term, label, phrase, or identifier for a concept in the third concept model, and wherein the second text is a name, term, label, phrase, or identifier for a concept in the second concept model;

the method further comprising g. constructing a concept adapter having second concept filter having a third Orthogonal Semantic Equivalence Map, h. using the second concept filter, applying the second set of assertions to the third Orthogonal Semantic Equivalence Map to produce a second intersection of the selected concepts from the first concept models for the first Orthogonal Semantic Equivalence Map and the third Orthogonal Semantic Equivalence Map, i. using the concept adapter, determining the narrowest common extension of the second intersection, and j. if the narrowest common extension is not a top level concept, designating the entity as matching the concept adapter over the first Orthogonal Semantic Equivalence Map.

16. The method of claim 4, further comprising providing a user interface for manipulating or constructing a concept filter based on an Orthogonal Semantic Equivalence Map.

17. The method of claim 4, further comprising storing the set of assertions in a repository comprising a relational database or a triplestore.

18. The method of claim 17, further comprising retrieving properties of the entity using a query language.

19. The method of claim 4, wherein the second Orthogonal Semantic Equivalence Map is different from the first Orthogonal Semantic Equivalence Map.

20. The method of claim 5, further comprising providing a user interface for manipulating or constructing a concept adapter based on Orthogonal Semantic Equivalence Maps.

21. The method of claim 5, wherein the third Orthogonal Semantic Equivalence Map is different from the second Orthogonal Semantic Equivalence Map.

22. The method of claim 1, wherein each concept represented in the Orthogonal Semantic Equivalence Map is identified by a unique identifier.

23. The method of claim 22, wherein the Orthogonal Semantic Equivalence Map is assigned a unique identifier, is stored in a structured format in a storage medium, and is retrievable via the unique identifier.

24. The method of claim 23, wherein the unique identifier assigned to the Orthogonal Semantic Equivalence Map is selected from the group consisting of Universally Unique Identifier (UUID), Globally Unique Identifier (or GUID), Digital Object Identifier (DOI), Archival Resource Key (or ARK), and Life Science Identifier (or LSID).

25. The method of claim 23, further comprising a. retrieving a second Orthogonal Semantic Equivalence Map from the storage medium using a second assigned unique identifier, b. comparing the selected set of (relation, concept) pairs to the set of (relation, concept) pairs in the second Orthogonal Semantic Equivalence Map retrieved from the storage medium, c. if the selected set of (relation, concept) pairs are the same as the second set of (relation, concept) pairs in the second Orthogonal Semantic Equivalence Map retrieved from the storage medium, a relation of synonymy is established between the narrowest common extension of the selected concepts in the first concept model and the narrowest common extension of the first concept model in the second Orthogonal Semantic Equivalence Map retrieved from the storage medium, and d. if the selected set of (relation, concept) pairs are not the same as any set of (relation, concept) pairs in Orthogonal Semantic Equivalence Maps retrieved from the storage medium, the selected set of (relation, concept) pairs is designated as a newly-discovered concept.

26. The method of claim 1, further comprising mapping a controlled vocabulary to each concept model, wherein the controlled vocabulary includes names, terms, labels, phrases, or identifiers such that:

a. any term within the controlled vocabulary may be resolved to a concept within a concept model within the Orthogonal Semantic Equivalence Map, and b. any term within the controlled vocabulary may be used to select or de-select the concept to which it resolves.

27. The method of claim 26, wherein the controlled vocabulary comprises a set of domain values from a relational database.

28. The method of claim 1, further comprising providing a user interface for manipulating or constructing the Orthogonal Semantic Equivalence Maps.

29. The method of claim 1, further comprising functionally mapping one or more classes in an ontology to one or more concepts in one or more Orthogonal Semantic Equivalence Maps.

30. The method of claim 1, further comprising encoding the Orthogonal Semantic Equivalence Maps in a knowledge base using a decidable formal logic.

31. The method of claim 30, further comprising checking the decidable formal logic that produces indirect entity properties for satisfiability based on existing entity properties.

32. The method of claim 1, further comprising encoding the Orthogonal Semantic Equivalence Map in an ontology using rules, constraints, functions, and templates.

33. A system for establishing semantic equivalence between a plurality of concepts, comprising:

a user interface;

a storage medium; and a controller in operative communication with the user interface and the storage medium, the controller comprising a computer processor running software, said processor:

a. providing an Orthogonal Semantic Equivalence Map in which first, second, and third extensional concept models are related to one another such that the second concept model is orthogonal to the first concept model and the third extensional concept model is distinct from the first and second concept models, wherein each concept from the first concept model has an intensional relation to one concept from the second concept model over one concept in the third concept model as a (relation, concept) pair, wherein each concept represented in the first concept model is selectable or de-selectable, and wherein each intensional relation between concepts in the first and second concept model is selectable or de-selectable;

b. at least one of selecting or de-selecting a concept in the first concept model;
c. at least one of selecting or de-selecting a (relation, concept) pair representing an intensional relation from a concept in the first concept model to a concept in the second concept model over a concept in the third concept model;
d. based on the at least one of selecting or de-selecting a concept in the first concept model, determining a subset of intensional relations from the selected concepts in the first concept model to concepts in the second concept model;
e. based on the at least one of selecting or de-selecting a (relation, concept) pair representing and intensional relation over a concept in the third concept model, determining a set of concepts from the first concept model that are related to concepts in the second concept model over the selected (relation, concept) pairs, f. based on the set of selected (relation, concept) pairs, determining a set of deselected (relation, concept) pairs; and
g. determining at least one of the narrowest common extension of the set of concepts from the first, second, or third concept models that are related over the selected intensional relations, wherein the narrowest common extension of the selected concepts from the first concept model is designated as being semantically equivalent to the set of selected (relation, concept) pairs relating each selected concept from the first concept model to a concept in the second concept model.

34. The system of claim 33, wherein the user interface comprises input and output devices in operative communication with the controller.

* * * * *